March 14, 1950     L. M. SELLS ET AL     2,500,914
CORNSTALK MACERATER

Filed Dec. 20, 1948     3 Sheets-Sheet 1

Witness
Merle A. Bjork

Inventors
Lyle M. Sells
Melvin A. Mandelko
by M. Talbert Dick
Attorney

March 14, 1950 L. M. SELLS ET AL 2,500,914
CORNSTALK MACERATER

Filed Dec. 20, 1948 3 Sheets-Sheet 2

Inventors
Lyle M. Sells
Melvin A. Mandelko by M. Talbert Dick
Attorney

Witness
Merle A Bjork

March 14, 1950     L. M. SELLS ET AL     2,500,914
CORNSTALK MACERATER

Filed Dec. 20, 1948     3 Sheets-Sheet 3

Witness
Merle A Bjork

Inventors
Lyle M. Sells
Melvin A. Mandelko
by M. Talbert Dick
Attorney

Patented Mar. 14, 1950

2,500,914

UNITED STATES PATENT OFFICE 2,500,914

CORNSTALK MACERATER

Lyle M. Sells and Melvin A. Mandelko,
Fort Dodge, Iowa

Application December 20, 1948, Serial No. 66,364

5 Claims. (Cl. 55—118)

The principal object of our invention is to provide a mechanical implement for farmers of corn or like crops, that is capable of successfully chopping, breaking and cutting the matured, dried stalks or stems of such plants into relatively small pieces, thereby not only facilitating the subsequent plowing of the ground for the next crop, but killing the larvae, eggs or worms of crop destroying pests that may be in, or associated with such stocks or stems.

A further object of this invention is to provide a cornstalk cutter or shredder for field that will service a large area quickly and easily.

A still further object of our invention is to provide a field cornstalk or like macerater that will successfully attack and cut up the cornstalks or like that are lying on or close to the ground.

A still further object of this invention is to provide a cornstalk breaker and shredder that is capable of reducing the stalks that may be resting between the rows as well as those stalks that are present in or upon the corn rows.

A still further object of our invention is to provide a corn or like stalk macerator that is economical in manufacture and durable in use.

These and other objects will be apparent to those skilled in the art.

Our invention consists in the construction, arrangement, and combination of the various parts of the device, whereby the objects contemplated are attained as hereinafter more fully set forth, pointed out in our claims, and illustrated in the accompanying drawings, in which:

The desirability of breaking cornstalks up into relatively small pieces after the crop has been gathered, has been known for many years. The first need to get rid of the troublesome stalks was so that the ground could be properly plowed for the next crop. However, in recent years a great menace to all corn growers has arisen. This is the European corn borer which is now destroying millions of dollars worth of crops each year. A major number of the larvae, eggs and worms in the cycle of this pest reside in or on the cornstalks. One method of eliminating the dry and brittle stock after the crop harvest is by burning. This is of course objectionable as it is difficult to accomplish, is time-consuming, and the stock is lost as a fertilizing agent for the soil. On the other hand, the chopping up of the stalks into small pieces and replacement of the same upon the earth surface not only kills the pests but provides a mulch and fertilizer for the ground. By the pieces being relatively small they are easily plowed under at time of spring ground conditioning. Some effort has been made to accomplish this chopping and breaking of the stalks. One such device is an attachment to the mechanical cornpicker. The objection to this system is that the corn and fodder normally left back of the cornpicker is not available as heretofore, for cows, hogs and like to pasture on. Furthermore, stalks that were down prior to the cornpicker are not affected. We have overcome such problems by providing a tractor pulled and powered implement that may be used after the farm animals have exhausted the corn field, and one that will pick up down-stalks and those stalks that are between the corn rows.

Figure 1:
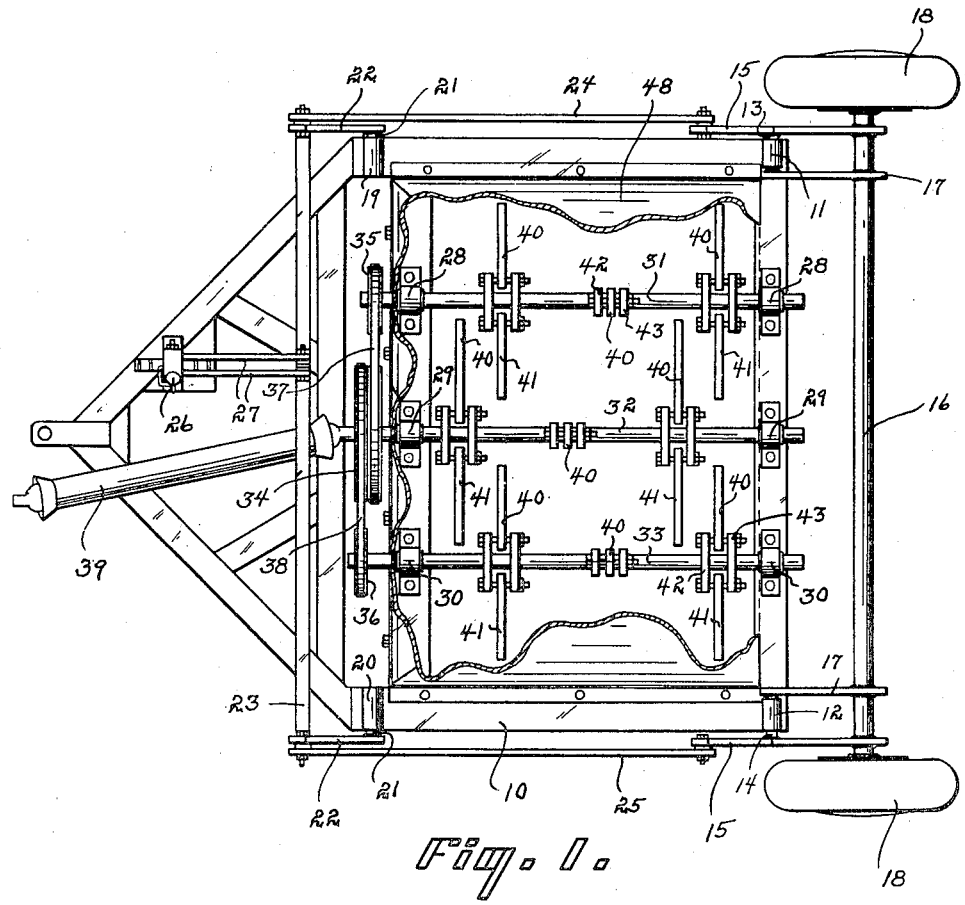
Fig. 1 is a top plan view of our device ready for use but with the hood cut away to more fully illustrate its construction.
Figure 3:
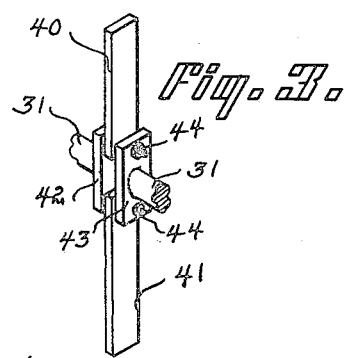
Fig. 3 is a perspective view of one of the breaking and cutting hammer assemblies.
Figure 2:
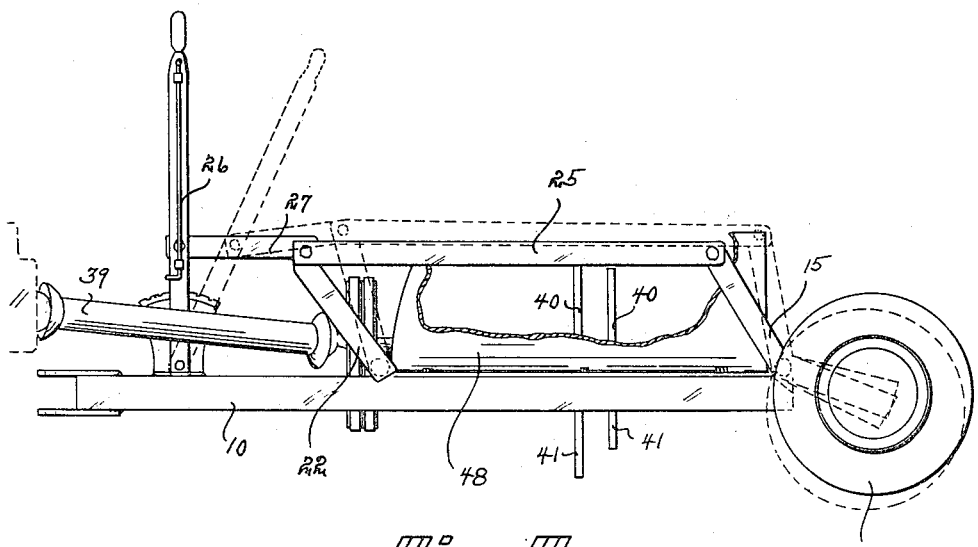
Fig. 2 is a side view of the device with a section of the hood cut away.
Figure 4:
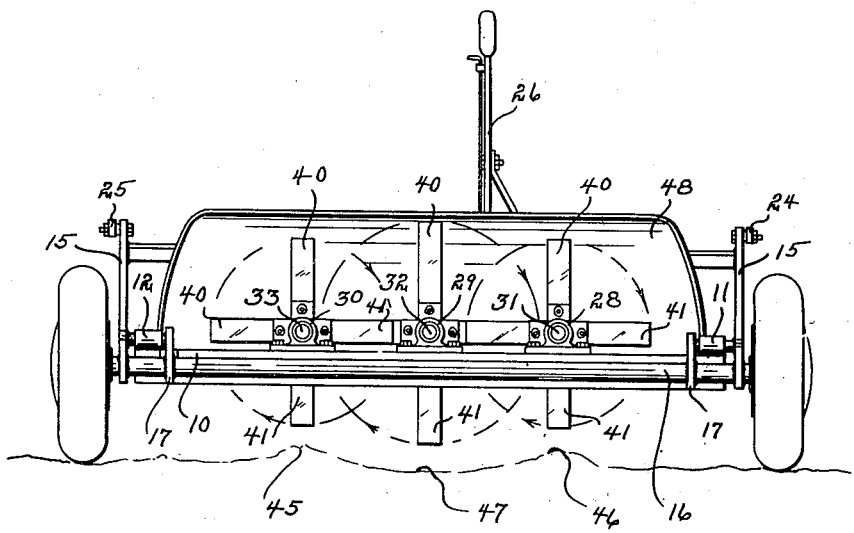
Fig. 4 is a rear view of the device in use.
Figure 5:
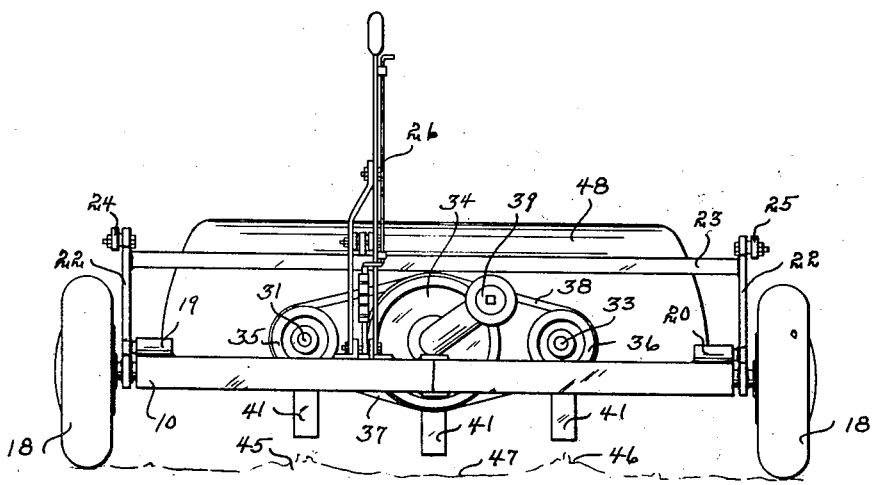
Fig. 5 is a front end view of the implement.

Referring to the drawings we have used the numeral 10 to designate the substantially rectangular frame of our device, the forward end of which is designed to be secured to a tractor (not shown). The numerals 11 and 12 designate two spaced apart bearing members on the rear end of the frame 10. Rotatably mounted in these two bearing members, respectively, are the two stub shafts 13 and 14. Secured to each of the stub shafts is a support arm 15. These two support arms each extend downwardly and rearwardly, are secured to their stub shafts near their center lengths and are bent at an angle at their pivot point, as shown in Fig. 2. The numeral 16 designates a horizontal shaft, extending transversely of the length of the frame 10, positioned to the rear thereof and secured to the rear ends of the support arms 15. To provide greater strength an additional short arm 17 is secured to each of the stub shafts 13 and 14 and the horizontal shaft 16. The numeral 18 designates wheels rotatably mounted on the horizontal shaft 16. Obviously, by this construction when the upper ends of the support arms are moved forwardly or rearwardly the elevation of the frame 10 relative to the supporting wheels 18 will be lowered or raised. The numerals 19 and 20 designate two spaced apart bearing members on the front portion of the frame 10. These two bearing members also have stub shafts 21 each secured to a control arm 22. These two control arms extend downwardly and rearwardly to the bearing members. The numeral 23 designates a bar secured to the upper ends of the two control arms 22. The numeral 24 designates a link connected to the bar 23 and the upper end of one of the support arms 15. The numeral 25 designates a similar link connected to the bar 23 and the upper end of the other support arm 15. The numeral 26 designates an ordinary manually operated lockable lever on the extreme central forward end of the frame 10. Links 27 connect this lever to the bar 23. By this arrangement the height of the frame 10 relative to the ground over which the implement travels may be easily and quickly adjusted and maintained by the lever 26. The numerals 28, 29 and 30 designate three sets of bearing members on the frame 10. These bearing members rotatably support the three spaced apart shafts 31, 32 and 33, respectively. These shafts are all in the same horizontal plane and extend parallel with each other and parallel with the length and travel of the implement. On the forward end of the shaft 32 is a large twin pulley wheel 34. A relatively smaller pulley wheel 35 is mounted on the forward end of the shaft 31. A pulley wheel 36 of the same size as the pulley wheel 35 is mounted on the forward end of the shaft 33. The numeral 37 designates an endless belt embracing the pulley wheel 34 and the pulley wheel 35. The numeral 38 designates an endless belt embracing the pulley wheel 34 and pulley wheel 36. The numeral 39 designates a universal joint shaft assembly connected to the shaft 32 and pulley wheel 34. The forward end of this shaft 39 is designed to be connected in the usual manner to the power take-off of the tractor used to pull device. Therefore, when the power take-off is running the shafts 31, 32, and 33 will be rotating with the shafts 31 and 33 rotating faster than the shaft 32. On each shaft 31, 32 and 33 are three sets of cutting, beating, breaking and shredding bar arms. Each set comprises two bars 40 and 41 pivoted at their inner ends by any suitable means to the shaft. In the drawings I show this accomplished by welding two spaced apart plates 42 and 43 on and around the shaft, and with the two bars 40 and 41 pivoted therebetween by bolts, rivets or like acting shafts 44. This construction is shown in detail in Fig. 2. The bars 40 and 41 are yieldingly held to extend outwardly from the shafts by centrifugal force, when the three shafts are rotating. The sets of these chopping bars are so arranged on the shafts 31, 32 and 33 that the bars on the shaft 32 will be staggered in longitudinal relation relative to the ones on the bars 31 and 33 so that they will not strike each other, while permitting their cutting arcs to overlap, as shown in Fig. 4. When the shafts are rotating the two bars of each unit will extend outwardly away from and in opposite directions from each other. The bars on the shaft 32 are longer than the bars on the shafts 31 and 33 and therefore cut a larger arc than the bars on the shafts 31 and 33. The reason for this is that the shafts 31 and 33 are designed to extend above two hill rows 45 and 46, as shown in Fig. 4, and such hill rows are higher in elevation than the usual hollow 47 between the rows. By the bars on the shaft 32 being longer than the bars on the shafts 31 and 33, they are able to extend into the hollow 47 between the hill rows and pick up stalks or like that may be resting therein. By the two shafts 31 and 33 rotating more rapidly than the shaft 32, the beating and cutting bars therein will be traveling ference in speed of the overlapping bars will increase the efficiency of macerating the cornstalks. The numeral 48 designates a hood or cover on the frame, extending over the cutting and chopping bars on the three shafts.

Some changes may be made in the construction and arrangement of our cornstalk macerater without departing from the real spirit and purpose of our invention, and it is our intention to cover by our claims, any modified forms of structure or use of mechanical equivalents which may be reasonably included within their scope.

We claim:

1. A cornstalk macerator including in combination, a frame portion having a pair of wheels supporting the frame, a tractor hitch attached to the frame, linkage means for raising and lowering the frame relative to the ground, a center shaft and two parallel shafts mounted on the frame, one on each side of the central shaft, a double pulley wheel mounted on the center shaft, a drive shaft connecting the center shaft to a drive source, pulleys on the respective side shafts and being of smaller diameter than the double pulley wheel, a pair of belts extending from the double pulley one to each of the side shaft pulleys, cutter bars hingedly secured to the respective shafts, the cutter bars of the side shafts spaced opposite to each other while the cutter bars of the center shaft are spaced longitudinally of the said side cutter bars, the cutter bars of the center shaft being longer and cutting on a greater arc than the cutter bars of the two side shafts.

2. A cornstalk macerator including in combination, a frame portion having a pair of wheels supporting the frame, a tractor hitch attached to the frame, linkage means for raising and lowering the frame relative to the ground, a plurality of rotary parallel cutter bar-carrying shafts mounted on the frame, drive means for rotating the shafts, cutter bars hingedly secured to the respective shafts, the cutter bars of one shaft being staggered with respect to the cutter bars of the next adjacent shaft, the cutting arcs of the cutter bars overlapping each other, the cutter bars of any two adjacent shafts being of different lengths and thereby cutting on different arcs, the shorter cutter bars cutting stalks along the corn hill rows, while the longer cutter bars cut stalks lying in the valleys between the hill rows.

3. A cornstalk macerator including in combination, a frame portion having a pair of wheels supporting the frame, a tractor hitch attached to the frame, linkage means for raising and lowering the frame relative to the ground, at least three rotary parallel shafts mounted on the frame and extending longitudinally of the frame, spaced sets of cutter bars hingedly mounted on said shafts, the cutter bars of one shaft being laterally spaced with respect to the cutter bars of the next adjacent shaft, the cutting arcs of the cutter bars overlapping each other, the cutter bars of two adjacent shafts being of different lengths whereby the cutter bars of any two adjacent shafts cut on different arcs, the shafts so spaced in the machine frame that the shorter cutter bars are aligned with the corn hill rows while the longer cutter bars are aligned with the valleys between the hill rows, when the machine is placed in operation on a corn field.

4. A machine for macerating cornstalks and the like comprising, a frame having rear wheels rotary cutter-carrying shafts mounted on and longitudinally of the frame, means to drive the rotary shafts, cutter members mounted on said shafts, the cutter members of any two adjacent shafts being laterally spaced with respect to each other, the arcs of the cutters overlapping each other, the cutting members of any two adjacent shafts being of different lengths and cutting on smaller and larger arcs, the smaller cutter spaced over the hill rows of a cornfield and the larger cutters spaced over the valleys of a cornfield when the machine is drawn over a cornfield.

5. A machine for macerating cornstalks and the like comprising, a frame having rear wheels for supporting the same, a plurality of parallel rotary cutter-carrying shafts mounted on and longitudinally of the frame, means to drive the rotary shafts, cutter members mounted on said shafts, the cutter members of any two adjacent shafts being laterally spaced with respect to each other, the cutting members of any two adjacent shafts being of different lengths and cutting on smaller and larger arcs, the smaller cutter spaced over the hill rows of a cornfield and the larger cutters spaced over the valleys of a cornfield when the machine is drawn over a cornfield.

LYLE M. SELLS.
MELVIN A. MANDELKO.

REFERENCES CITED

The following references are of record in the file of this patent:

UNITED STATES PATENTS

| Number | Name | Date |
|---|---|---|
| 988,844 | Wilson | Apr. 4, 1911 |
| 1,030,156 | Bermes | June 18, 1912 |
| 1,718,564 | Kietzke | June 25, 1929 |
| 1,824,098 | Patzschke | Sept. 22, 1931 |

OTHER REFERENCES

Farm Implement News Magazine of Jan. 15, 1948, page 16, Humboldt Stalk Cutter Advertisement.